US006186709B1

(12) United States Patent
Hsu

(10) Patent No.: US 6,186,709 B1
(45) Date of Patent: Feb. 13, 2001

(54) SPEED CHANGE CONTROL STRUCTURE FOR AN ELECTRIC TOOL

(75) Inventor: Hung-Ming Hsu, Sanchung (TW)

(73) Assignee: Mobiletron Electronics Co., Ltd., Taichung (TW)

( * ) Notice: Under 35 U.S.C. 154(b), the term of this patent shall be extended for 0 days.

(21) Appl. No.: 09/288,706

(22) Filed: Apr. 9, 1999

(51) Int. Cl.[7] ..................... B23B 39/00
(52) U.S. Cl. ..................... 408/241 R; 200/547; 200/318.2
(58) Field of Search ..................... 408/124, 241 R; 200/547, 548, 522, 321, 318.2

(56) References Cited

U.S. PATENT DOCUMENTS

| | | | | |
|---|---|---|---|---|
| 3,766,352 | * | 10/1973 | Bigley et al. | 200/547 |
| 3,833,784 | * | 9/1974 | Bobel et al. | 200/547 |
| 3,839,614 | * | 10/1974 | Saganowski et al. | 200/547 |
| 4,441,000 | * | 4/1984 | Suwa | 200/548 |
| 4,592,144 | * | 6/1986 | Tolbert et al. | 200/547 |
| 5,365,028 | * | 11/1994 | Takano | 200/547 |
| 5,862,714 | * | 1/1999 | Fujimoto | 200/548 |

* cited by examiner

*Primary Examiner*—Steven C. Bishop
(74) *Attorney, Agent, or Firm*—Rosenberg, Klein & Lee

(57) ABSTRACT

A speed change control structure for an electric tool is adapted to be provided near a speed change device of the electric tool and includes at least one speed change forked rod, a speed control push block, an elastic latch member, and an insert hole formed in a housing of the electric tool. The insert hole has two opposed walls each of which is provided with an inner projection. The speed control push block is formed with a through hole for mounting of the elastic latch member. The elastic latch member includes a push button, a bow-shaped packing ring fitted to a rear end of the push button, and a squeeze plate connected to the rear end of the push button, such that the push button and the bow-shaped packing ring are exposed on the surface of the speed control push block, and the squeeze plate is elastically retained and supported between the bow-shaped walls at the inner end of the speed control push block. When the push button is pressed, the squeeze plate is caused to displace so that the bow-shaped walls can elastically slide past the inner projections to allow pushing of the speed control push block, thereby preventing possible accidents caused by inadvertent pressing of the press button or pushing of the push block.

3 Claims, 3 Drawing Sheets

SPEED CHANGE CONTROL STRUCTURE FOR AN ELECTRIC TOOL

BACKGROUND OF THE INVENTION (a) Field of the Invention

The present invention relates to a speed change control structure for an electric tool, and more particularly to a speed change control structure that can prevent actuation of the speed change device caused by inadvertent pressing of a push button or pushing of a push block.

(b) Description of the Prior Art

Speed change control structures are commonly found in all kinds of electric tools. For speed change control structures that are exposed on housing of the electric tools, they are mostly in the form of a single push block or a single press button. When the push block or the press button is embedded in the housing, a speed change device inside the electric tool. During operation, the push block is pushed in a single direction or the press button is pressed to actuate the electric tool. Although the operation thereof is simple and convenient, inadvertent actuation of the electric tool may occur, which lead to accidents. Disadvantages of the prior art can therefore be summed up as follows:

1. As conventional speed change device can be easily actuated by moving the push block or pressing the press button, if the electric tool is disposed in a place to where children have access, accidents may occur.
2. Inadvertent actuation of the speed change control structure that causes the speed of an electric tool to increase may result in sticking of the cutter of electric tool in the workpiece or breaking thereof. If the speed change control structure is inadvertently actuated and the speed of the electric tool as a result increases, the cutter on the electric tool may become stuck in the workpiece or break. For instance, if an electric drill is used to bore holes in a hard workpiece and the torque of the electric drill at high speed is insufficient, it should work at a low speed in order to achieve a greater drilling torque. If the speed change control structure is actuated inadvertently so that the drilling speed is instantly increased, the drill bit may become stuck in the workpiece. Continuous drilling may even result in overheating of the electric drill or breaking of the drill bit. The broken pieces may fly over the place and hurt the operator and people nearby.

3. Inadvertent actuation of the speed change control structure that causes the speed of an electric tool to increase may also result in melting of the workpiece due to high-speed rotation of the cutter. For instance, if an electric saw is used to cut an acrylic board or a board made from petrochemical materials, the cutting speed cannot be excessive. If the speed instantly increases due to inadvertent actuation of the speed change control structure, friction between the saw blade and the workpiece will drastically increase, and the region surrounding the sawed portion will melt due to high heat, and the molten portions will stick to the saw blade and prevent movement of the saw blade. As a result, not only the sawed material will become useless, the electric saw will also be damaged.

SUMMARY OF THE INVENTION

Therefore, a primary object of the present invention is to provide a speed change control structure for an electric tool that can prevent actuation of the speed change device caused by inadvertent pressing of a push button or pushing of a push block, and that is provided with an elastic latch member for safety purposes.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
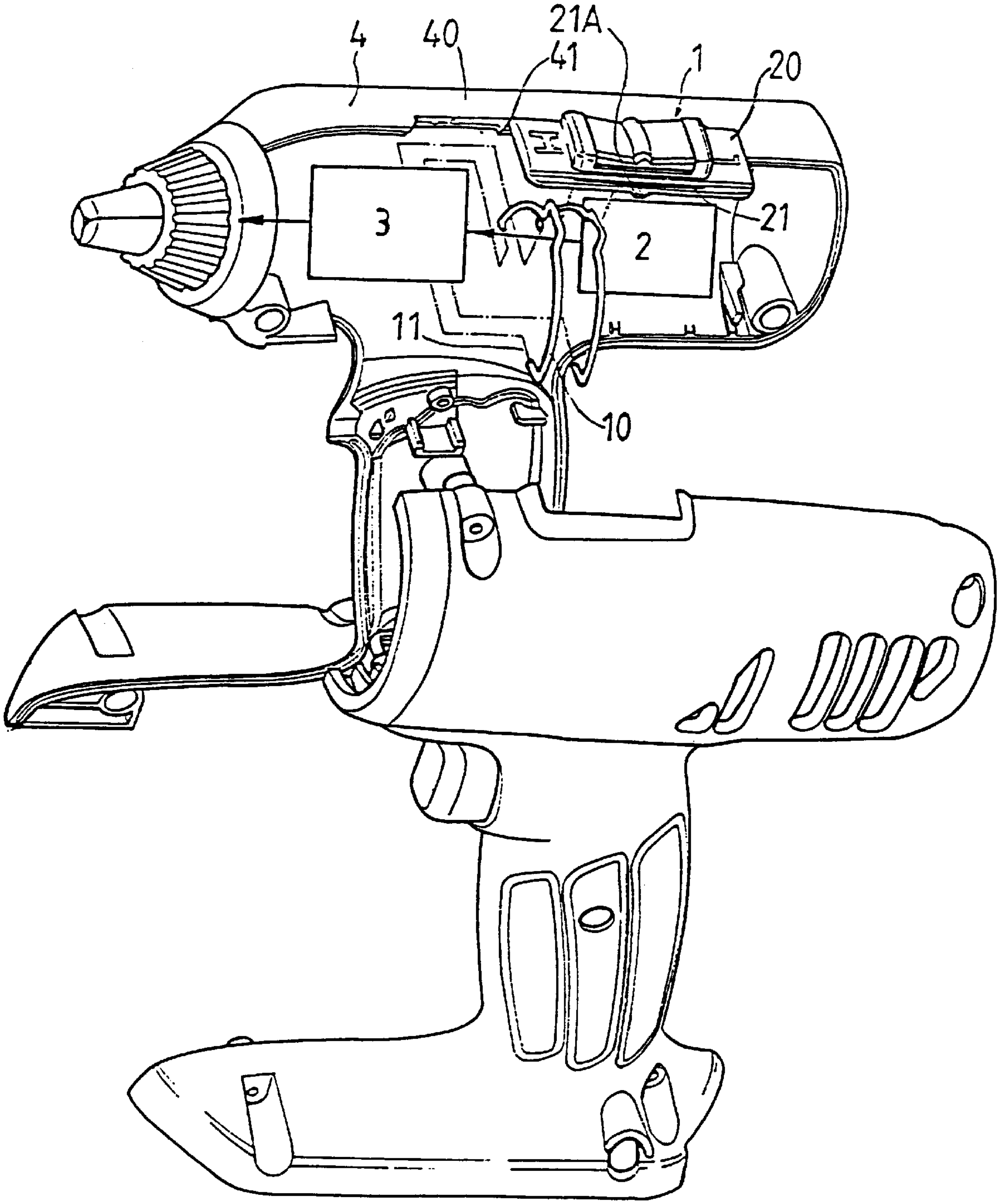
FIG. 1 is a partly cut-away view of an electric tool showing the mounting position of a preferred embodiment of a speed change control structure according to the present invention.
Figure 2:
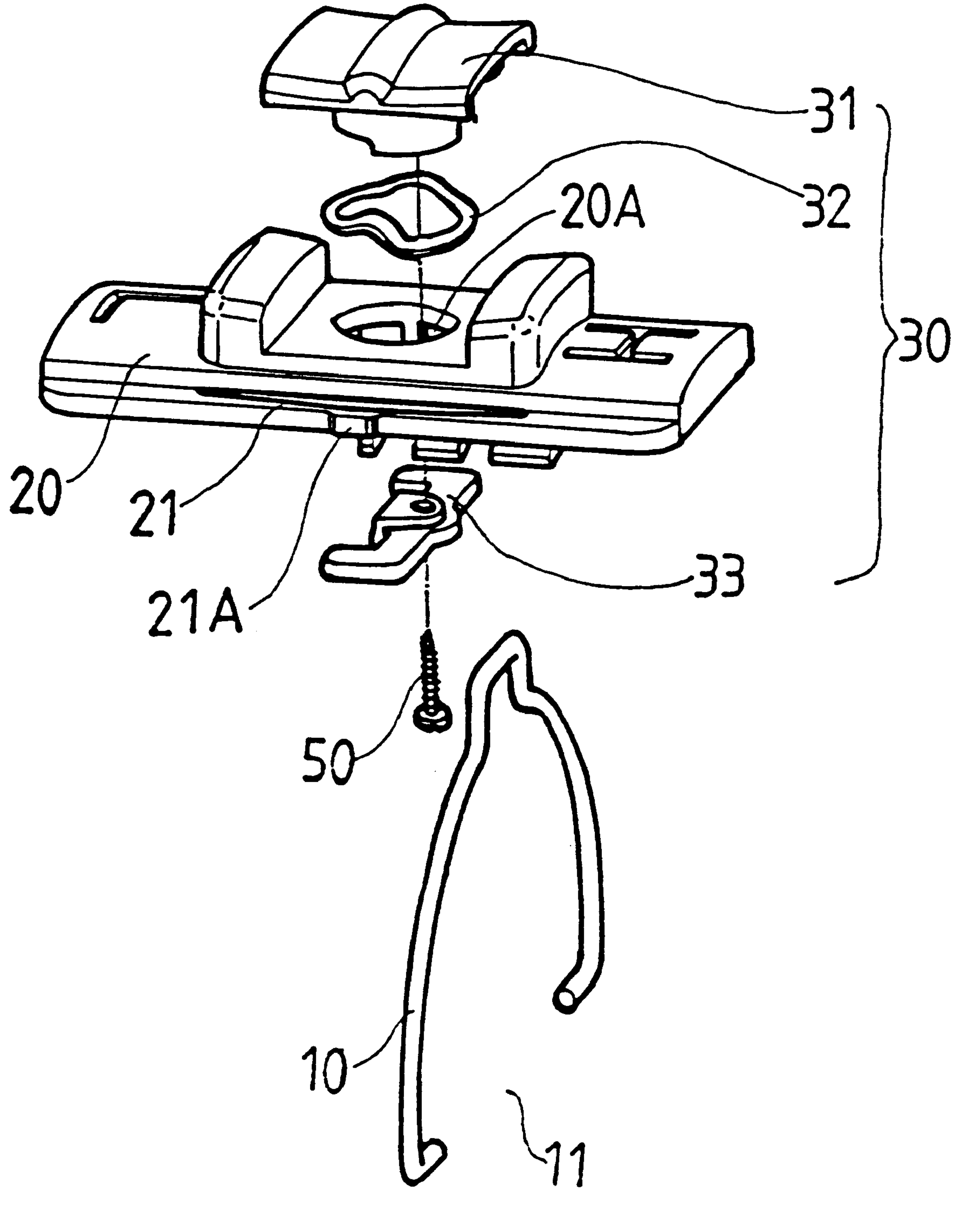
FIG. 2 is an exploded perspective view of the preferred embodiment.

With reference to FIGS. 1 and 2, the preferred embodiment of a speed change control structure 1 for electric tools according to the present invention is shown to be provided near a speed change device 3 of an electric tool 4. The speed change device 3 is adapted to convert the rotational speed output by an electric motor 2 of the electric tool 4. The speed change control structure 1 is shown to include at least one speed change forked rod 10, a speed control push block 20, and an elastic latch member 30. An insert hole 40 is formed in a housing of the electric tool 4. The insert hole 40 has opposed side walls each of which is provided with an inner projection 41. The speed control push block 20 covers the insert hole 40. The at least one speed change forked rod 10 has a clamping opening 11 for clamping the speed change device 3, and an insert end opposite to the clamping opening 11 and insertably disposed on an inner end of the speed control push block 20 covering the insert hole 40. Furthermore, at that end of the speed control push block 20 where it joins the speed change forked rod 10, elongated bow-shaped walls 21 extend outwardly from both sides thereof. Each of the bow-shaped walls 21 has an outer end forming a projecting urging block 21A. The distance between the two urging blocks 21A on both sides of the speed control push block 20 is greater than that between the inner projections 41. The speed control push block 20 is further formed with a through hole 20A for mounting of the elastic latch member 30. The elastic latch member 30 includes a press button 31, a bow-shaped packing ring 32 fitted to a rear end of the press button 31, and a squeeze plate 33 connected to the rear end of the press button 31 by using an adhesive or a screw 50. The press button 31 and the bow-shaped packing ring 32 are caused to be exposed on the surface of the speed control push block 20, with the squeeze plate 33 retained and supported between the bow-shaped walls 21 at the inner end of the speed control push block 20. In addition, markings such as "L" and "H" can be provided at the two ends of the speed control push block 20 or at appropriate positions on the housing of the electric tool 4 to indicate the speed levels for the user's reference and to enable the user to know the correct direction of the speed control push block 20 during speed regulation.

Figure 3:
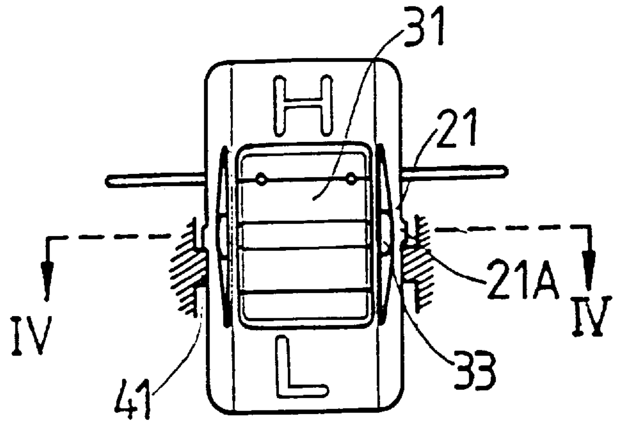
FIG. 3 is a top view of the preferred embodiment in a latched state.
Figure 4:
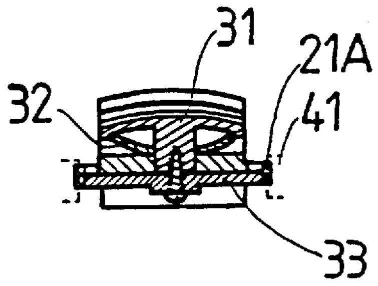
FIG. 4 is a sectional view taken along line IV—IV of FIG. 3.

Referring to FIGS. 3 and 4, under normal conditions when speed regulation is not required, the squeeze plate 33 is pulled upwardly between the two bow-shaped walls 21 by utilizing the elasticity of the bow-shaped packing ring 32, so that the rear ends of the bow-shaped walls 21 are urged against by edges of the squeeze plate 33 to thereby achieve a firm supporting structure, and the distance between the urging blocks 21A of the bow-shaped walls 21 can be maintained so that no passage is allowed through the narrower distance between the inner projections 41 to thereby achieve a latching effect. Hence, even when the speed control push block 20 is inadvertently touched, it cannot be pushed to the other end to allow speed change, thereby preventing possible accidents.

Figure 5:
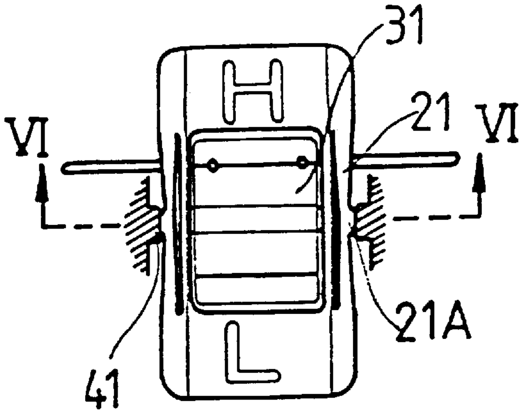
FIG. 5 is a top view of the preferred embodiment in an unlatched state.
Figure 6:
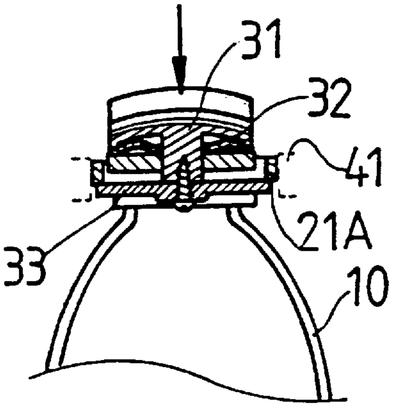
FIG. 6 is a sectional view taken along line VI—VI of FIG. 5.

Referring to FIGS. 5 and 6, during speed regulation, the press button 31 is firstly pressed to depress the bow-shaped packing ring 32, so that the squeeze plate 33 below falls and is disengaged from the bow-shaped walls 21. As the rear ends of the bow-shaped walls 21 are no longer subjected to the urging force of the edges of the squeeze plate 33, they can elastically retract under an external impact due to elasticity of their thin and flat construction, so that the distance between the urging blocks 21A can be reduced to maintain the pressure on the press button 31. When a force is exerted on the press button 31 to cause the speed control push block 210 to displace, the urging blocks 21 projecting from the bow-shaped walls 21 will be squeezed by the inner projections 41 on both sides thereof to allow unlatching. Hence, the speed control push block 20 can slidably displace to the other end to cause the speed change forked rod 10 to proceed with speed change. When the speed control push block 20 has displaced to a desired speed position, the pressure on the press button 31 and the speed control push block 20 is released so that the squeeze plate 33 is subjected to the elasticity of the bow-shaped packing ring 32 and resets to the position between the bow-shaped walls in a latched state to ensure that the speed control push block 20 is positively locked in position. It can therefore be appreciated that speed regulation according to the present invention requires firstly pressing of the press button 31 and then pushing of the push block 20. In addition, corners of the urging blocks 21A may be configured to have inverted tangential or curved angles to enable the urging blocks 21A to be readily squeezable by the inner projections 41.

In view of the above, the speed change control structure for electric tools according to the present invention is provided with a latching function to ensure that speed change cannot be easily achieved by pushing of the push block or pressing of the press button in a single direction so as to prevent possible accidents caused by inadvertent touching of the push block or the press button of the electric tool.

Although the present invention has been illustrated and described with reference to the preferred embodiment thereof, it should be understood that it is in no way limited to the details of such embodiment but is capable of numerous modifications within the scope of the appended claims.

What is claimed is:

1. A speed change control structure for an electric tool, said speed change control structure being provided near a speed change device of the electric tool and comprising at least one speed change forked rod, a speed control push block, an elastic latch member, and an insert hole formed in a housing of the electric tool, said insert hole having two opposed walls each of which is provided with an inner projection, said speed control push block covering said insert hole, said at least one speed change forked rod having a clamping opening adapted to clamp said speed change device, and an insert end opposite to said clamping opening and insertably disposed on an inner end of said speed control push block that covers said insert hole, two elongate bow-shaped walls extending outwardly from both sides of the end of said speed control push block where it is connected to said speed change forked rod, said bow-shaped walls each having an outer end forming a projecting urging block, said urging blocks defining a width therebetween that is greater than a distance between said inner projections, said speed control push block being formed with a through hole for mounting of said elastic latch member, said elastic latch member including a push button, a bow-shaped packing ring fitted to a rear end of said push button, and a squeeze plate connected to said rear end of said push button, such that said push button and said bow-shaped packing ring are exposed on a surface of said speed control push block, and said squeeze plate is elastically retained and supported between said bow-shaped walls at said inner end of said speed control push block.

2. A speed change control structure for an electric tool as defined in claim 1, wherein urging blocks have corners configured to have inverted tangential angles.

3. A speed change control structure for an electric tool as defined in claim 1, wherein urging blocks have corners configured to have curved angles.

* * * * *